(12) United States Patent
Lee et al.

(10) Patent No.: US 11,588,993 B2
(45) Date of Patent: Feb. 21, 2023

(54) CURRENT SENSING DEVICE AND ORGANIC LIGHT EMITTING DISPLAY DEVICE INCLUDING THE SAME

(71) Applicant: LG Display Co., Ltd., Seoul (KR)

(72) Inventors: Taeyoung Lee, Paju-si (KR); Myunggi Lim, Daegu (KR); Kyoungdon Woo, Paju-si (KR); Bumsik Kim, Daegu (KR); Seungtae Kim, Paju-si (KR); Byungjae Lee, Daegu (KR); Minkyu Song, Daegu (KR)

(73) Assignee: LG Display Co., Ltd., Seoul (KR)

( * ) Notice: Subject to any disclaimer, the term of this patent is extended or adjusted under 35 U.S.C. 154(b) by 146 days.

(21) Appl. No.: 16/583,670

(22) Filed: Sep. 26, 2019

(65) Prior Publication Data

US 2020/0106976 A1    Apr. 2, 2020

(30) Foreign Application Priority Data

Sep. 28, 2018    (KR) .................. 10-2018-0116096

(51) Int. Cl.
*H04N 5/369*    (2011.01)
*G09G 3/3291*    (2016.01)
(Continued)

(52) U.S. Cl.
CPC ......... *H04N 5/3698* (2013.01); *G09G 3/3233* (2013.01); *G09G 3/3291* (2013.01); *H04N 5/374* (2013.01)

(58) Field of Classification Search
IPC .................. G09G 3/3233,3/3291, 2330/06, 2320/0295, 2300/0426, 2320/045;
(Continued)

(56) References Cited

U.S. PATENT DOCUMENTS

| 7,924,332 B2 | 4/2011 | Gruev et al. |
| 9,685,119 B2 | 6/2017 | Kim et al. |

(Continued)

FOREIGN PATENT DOCUMENTS

| CN | 101533636 A | 9/2009 |
| CN | 101803368 A | 8/2010 |

(Continued)

*Primary Examiner* — Hrayr A Sayadian
(74) *Attorney, Agent, or Firm* — Seed IP Law Group LLP (57) ABSTRACT

A current sensing device and the organic light-emitting display device including the same are disclosed. The current sensing device may include a plurality of sensing units, each sensing unit playing a role of converting a pixel current input through a sensing line into a digital sensing value, and each sensing unit comprising: a current integrator including an integrating amplifier and a feedback capacitor, the integrating amplifier comprising an inverting input terminal, a non-inverting input terminal and an output terminal, wherein the feedback capacitor is connected between the inverting input terminal and the output terminal, and a first reference voltage is input to the non-inverting input terminal; and a current transmitting unit connected between the sensing line and the current integrator to separate the electric connection of the sensing line and the current integrator, wherein the current transmitting unit mirrors the pixel current and causes the mirrored current to be output from the inverting input terminal of the integrating amplifier.

4 Claims, 7 Drawing Sheets

(51) Int. Cl.
*G09G 3/3233* (2016.01)
*H04N 5/374* (2011.01)
(58) Field of Classification Search
IPC .......................................... H04N 5/374,5/3698
See application file for complete search history.

(56) References Cited

U.S. PATENT DOCUMENTS

| | | | |
|---|---|---|---|
| 10,089,928 | B2 | 10/2018 | Yoo et al. |
| 10,152,920 | B2 | 12/2018 | Lee et al. |
| 10,204,550 | B2 | 2/2019 | Hwang et al. |
| 10,347,692 | B2 | 7/2019 | Lee et al. |
| 2003/0042406 | A1* | 3/2003 | Charbon .................. G01J 1/46 250/214 A |
| 2008/0180112 | A1* | 7/2008 | Lauxtermann ....... H04N 3/1568 327/551 |
| 2013/0082936 | A1 | 4/2013 | Islamkulov et al. |
| 2014/0152642 | A1 | 6/2014 | Kim et al. |
| 2016/0163261 | A1* | 6/2016 | Kim ..................... G09G 3/3225 345/205 |
| 2017/0208265 | A1* | 7/2017 | Lin .......................... G01J 9/00 |
| 2017/0277931 | A1 | 9/2017 | Uehara et al. |

FOREIGN PATENT DOCUMENTS

| | | |
|---|---|---|
| CN | 103854602 A | 6/2014 |
| CN | 104021755 A | 9/2014 |
| CN | 105280140 A | 1/2016 |
| CN | 105321455 A | 2/2016 |
| CN | 105702209 A | 6/2016 |
| CN | 107293239 A | 10/2017 |
| CN | 107665671 A | 2/2018 |
| CN | 107978259 A | 5/2018 |
| JP | 2002107428 A | 4/2002 |
| JP | 2016009185 A | 1/2016 |
| KR | 10-2011-0032937 A | 3/2011 |
| KR | 10-2014-0071097 A | 6/2014 |
| KR | 10-2016-0069922 A | 6/2016 |

\* cited by examiner

CURRENT SENSING DEVICE AND ORGANIC LIGHT EMITTING DISPLAY DEVICE INCLUDING THE SAME

CROSS-REFERENCE TO RELATED APPLICATION

This application claims the is based on and claims priority to Korea Patent Application No. 10-2018-0116096 filed on Sep. 28, 2018, which is incorporated herein by reference for all purposes as if fully set forth herein.

BACKGROUND

Technical Field

The present document relates to an organic light-emitting display device, and more particularly, to a current sensing device and the organic light-emitting display device including the same.

Description of the Related Art

An active matrix organic light emitting display device includes organic light emitting diodes (OLEDs) capable of emitting light by themselves and has many advantages, such as a fast response speed, a high emission efficiency, a high luminance, a wide viewing angle, and the like.

The organic light emitting display device arranges pixels each including an OLED in a matrix form and adjusts a luminance of the pixel based on a grayscale of video data. Each pixel includes a driving thin film transistor (TFT) controlling a pixel current flowing through the OLED based on a voltage Vgs between a gate electrode and a source electrode of the driving TFT. The driving characteristics of the OLED and the driving TFT are changed by temperature or deterioration. If the driving characteristics of the OLED and/or the driving TFT are different for each pixel, even if the same image data is written to pixels, the luminance between the pixels is different, so that it is difficult to realize a desired image quality.

An external compensation scheme is well-known for compensating for the change of the driving characteristics of the OLED or the driving TFT. The external compensation scheme senses the change of the driving characteristics of the OLED or the driving TFT and modulates image data based on the sensing results.

BRIEF SUMMARY

The organic light emitting display device uses a current integrator in order to sense a pixel current corresponding to the driving characteristics of the OLED or the driving TFT. Since the current integrator is connected to each channel, the organic light emitting display device is equipped with a plurality of current integrators. The current integrator is advantageous in reducing the sensing time by enabling low current and high-speed sensing, but it is vulnerable to noise. The noise is caused by the variation of the reference voltage applied to the non-inverting input terminal of the current integrator and the noise source difference between the sensing lines connected to the inverting input terminal of the current integrator.

The capacitance of the feedback capacitor included in the current integrator is designed to be small in order to make the sensing time and the output voltage between the current integrators constant. If the capacitance of the feedback capacitor is small, the noise mixed in the reference voltage is easily amplified due to the parasitic capacitance of the sensing lines. Because the noise amplified in the current integrator is reflected on an integrated value, the noise may distort the sensing result for the pixel current. If sensing performance is degraded, the driving characteristics of the OLED and/or the driving TFT cannot be accurately sensed and compensated for.

Accordingly, an objective of the present disclosure is to provide a current sensing device and an organic light emitting display device which can minimize the distortion of a sensing result due to noise.

In one aspect, there is provided a current sensing device including a plurality of sensing units, each sensing unit playing a role of converting a pixel current input through a sensing line into a digital sensing value, and each sensing unit comprising: a current integrator including an integrating amplifier and a feedback capacitor, the integrating amplifier comprising an inverting input terminal, a non-inverting input terminal and an output terminal, wherein the feedback capacitor is connected between the inverting input terminal and the output terminal, and a first reference voltage is input to the non-inverting input terminal; and a current transmitting unit connected between the sensing line and the current integrator to separate the electric connection of the sensing line and the current integrator, wherein the current transmitting unit mirrors the pixel current and causes the mirrored current to be output from the inverting input terminal of the integrating amplifier.

According to one or more embodiments of the present disclosure, the current transmitting unit may comprise: a first mirroring transistor, wherein a gate electrode and a first electrode of the first mirroring transistor is connected to a shared node to which the pixel current is applied, and a second electrode of the first mirroring transistor is connected to a ground voltage source; and a second mirroring transistor, wherein a gate electrode of the second mirroring transistor is connected to the shared node, the first electrode of the second mirroring transistor is connected to the inverting input terminal of the integrating amplifier, and a second electrode of the second mirroring transistor is connected to the ground voltage source.

According to one or more embodiments of the present disclosure, the mirrored current may be greater than the pixel current, and a channel capacitance of the second mirroring transistor may be greater than a channel capacitance of the first mirroring transistor.

According to one or more embodiments of the present disclosure, the current sensing device may further comprise a current buffer connected between the sensing line and the current transmitting unit, wherein the current buffer may apply a second reference voltage to the pixel through which the pixel current flows to fix a voltage of a source node of the pixel to be constant.

According to one or more embodiments of the present disclosure, the current buffer may comprise: a buffer amplifier, wherein an inverting input terminal of the buffer amplifier may be connected to the sensing line, the second reference voltage may be input to a non-inverting input terminal of the buffer amplifier, and an output terminal of the buffer amplifier may be connected to a buffer transistor; and the buffer transistor, wherein a gate electrode of the buffer transistor may be connected to the output terminal of the buffer amplifier, a first electrode of the buffer transistor may be connected to the sensing line, and a second electrode of the buffer transistor may be connected to the current transmitting unit.

According to one or more embodiments of the present disclosure, the current buffer may further comprise: a buffer switch connected between the sensing line and the output terminal of the buffer amplifier, and turned on in synchronization with a timing for resetting the source node of the pixel to the second reference voltage.

According to one or more embodiments of the present disclosure, the second reference voltage may be set substantially equal to the first reference voltage.

According to one or more embodiments of the present disclosure, an output voltage applied to the output terminal of the integrating amplifier may change in a rising direction based on the first reference voltage.

In another aspect, there is provided an organic light emitting display device comprising: a display panel equipped with a plurality of pixels and a plurality of sensing lines connected to the pixels; a data driving circuit which includes the above current sensing device and connected to each sensing line through a sensing channel; and a timing controller configured to compensate digital image data to be written to the display panel based on the digital sensing value input from the sensing unit.

According to one or more embodiments of the present disclosure, a plurality of data lines and sensing lines and a plurality of gate lines may cross each other on the display panel, wherein the pixels for sensing may be arranged in a matrix form to form a pixel array, wherein each pixel may be connected to one of the data lines, one of the sensing lines and one of the gate lines.

According to one or more embodiments of the present disclosure, the organic light emitting display device may further comprise a gate driving circuit which generates a scan control signal and a sense control signal suitable for an image displaying operation and an external compensating operation based on gate control signals and supplies the scan control signal and the sense control signal to same or different gate line.

According to one or more embodiments of the present disclosure, the timing controller may generate data control signals for controlling operating timings of the data driving circuit and the gate control signals for controlling operating timings of the gate driving circuit, wherein the timing controller may temporally separate a period during which the image displaying operation is performed and a period during which the external compensating operation is performed and generate the control signals for the image displaying operation and the control signals for the external compensating operation.

According to one or more embodiments of the present disclosure, each pixel may include an OLED and a driving TFT, wherein the timing controller may receive the digital sensing value from the data driving circuit, correct input image data based on the digital sensing values to compensate for a deteriorating deviation of the driving TFT or the OLED among the pixels, and transmit the corrected digital image data to the data driving circuit in the period during which the image displaying operation is performed.

BRIEF DESCRIPTION OF THE DRAWINGS

The accompanying drawings, which are included to provide a further understanding of the present disclosure and are incorporated in and constitute a part of this specification, illustrate embodiments of the present disclosure and together with the description serve to explain the principles of the present disclosure. In the drawings.

DETAILED DESCRIPTION

The advantages and features of the present disclosure and methods of accomplishing the same may be understood more readily by reference to the following detailed descriptions of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the present disclosure to those skilled in the art, and the present disclosure is defined by the appended claims.

The shapes, sizes, percentages, angles, numbers, etc. shown in the figures to describe the exemplary embodiments of the present disclosure are merely examples and not limited to those shown in the figures. Like reference numerals denote like elements throughout the specification. When the terms 'comprise', 'have', 'include' and the like are used, other parts may be added as long as the term 'only' is not used. The singular forms may be interpreted as the plural forms unless explicitly stated.

The elements may be interpreted to include an error margin even if not explicitly stated.

When the position relation between two parts is described using the terms 'on', 'over', 'under', 'next to' and the like, one or more parts may be positioned between the two parts as long as the term 'immediately' or 'directly' is not used.

It will be understood that, although the terms first, second, etc., may be used to describe various elements, these elements should not be limited by these terms. These terms are only used to distinguish one element from another element. Thus, a first element referred to below may be a second element within the scope of the present disclosure.

Same reference numerals substantially denote same elements throughout the specification.

In this specification, the pixel circuit and the gate driver formed on the substrate of a display panel may be implemented by a TFT of an n-type MOSFET structure, but the present disclosure is not limited thereto so the pixel circuit and the gate driver may be implemented by a TFT of a p-type MOSFET structure. The TFT or the transistor is the element of 3 electrodes including a gate, a source and a drain. The source is an electrode for supplying a carrier to the transistor. Within the TFT the carrier begins to flow from the source. The drain is an electrode from which the carrier exits the TFT. That is, the carriers in the MOSFET flow from the source to the drain. In the case of the n-type MOSFET NMOS, since the carrier is an electron, the source voltage has a voltage lower than the drain voltage so that electrons can flow from the source to the drain. In the n-type MOSFET, a current direction is from the drain to the source because electrons flow from the source to the drain. On the other hand, in the case of the p-type MOSFET PMOS, since the carrier is a hole, the source voltage has a voltage higher than the drain voltage so that holes can flow from the source to the drain. In the p-type MOSFET, a current direction is from the source to the drain because holes flow from the source to the drain. It should be noted that the source and drain of the MOSFET are not fixed. For example, the source and drain of the MOSFET may vary depending on the applied voltage. Therefore, in the description of the present disclosure, one of the source and the drain is referred to as a first electrode, and the other one of the source and the drain is referred to as a second electrode.

Hereinafter, various embodiments of the present disclosure will be described in detail with reference to the accompanying drawings. In the following embodiments, an electroluminescent display device will be described mainly with respect to an organic light emitting display device including organic light emitting material. However, the present disclosure is not limited to the organic light emitting display device, but may be applied to an inorganic light emitting display device including inorganic light emitting material.

In describing the present disclosure, detailed descriptions of well-known functions or configurations related to the present disclosure will be omitted to avoid unnecessarily obscuring the present disclosure.

Figure 1:
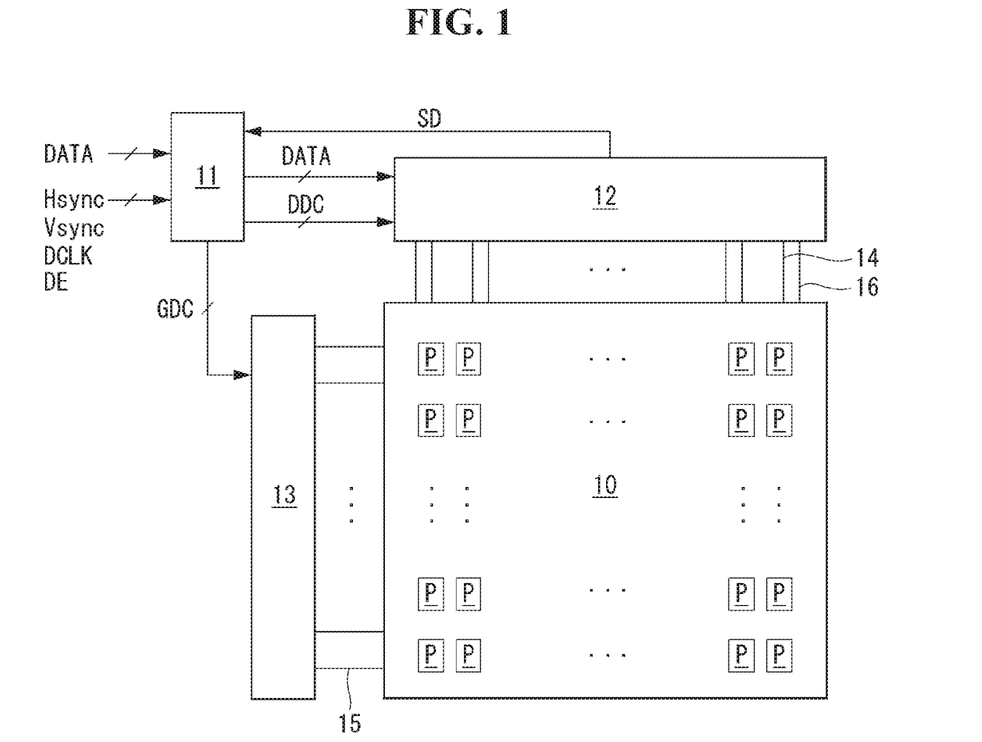
FIG. 1 shows a block diagram illustrating an organic light emitting display device according to an embodiment of the present disclosure.
Figure 2:
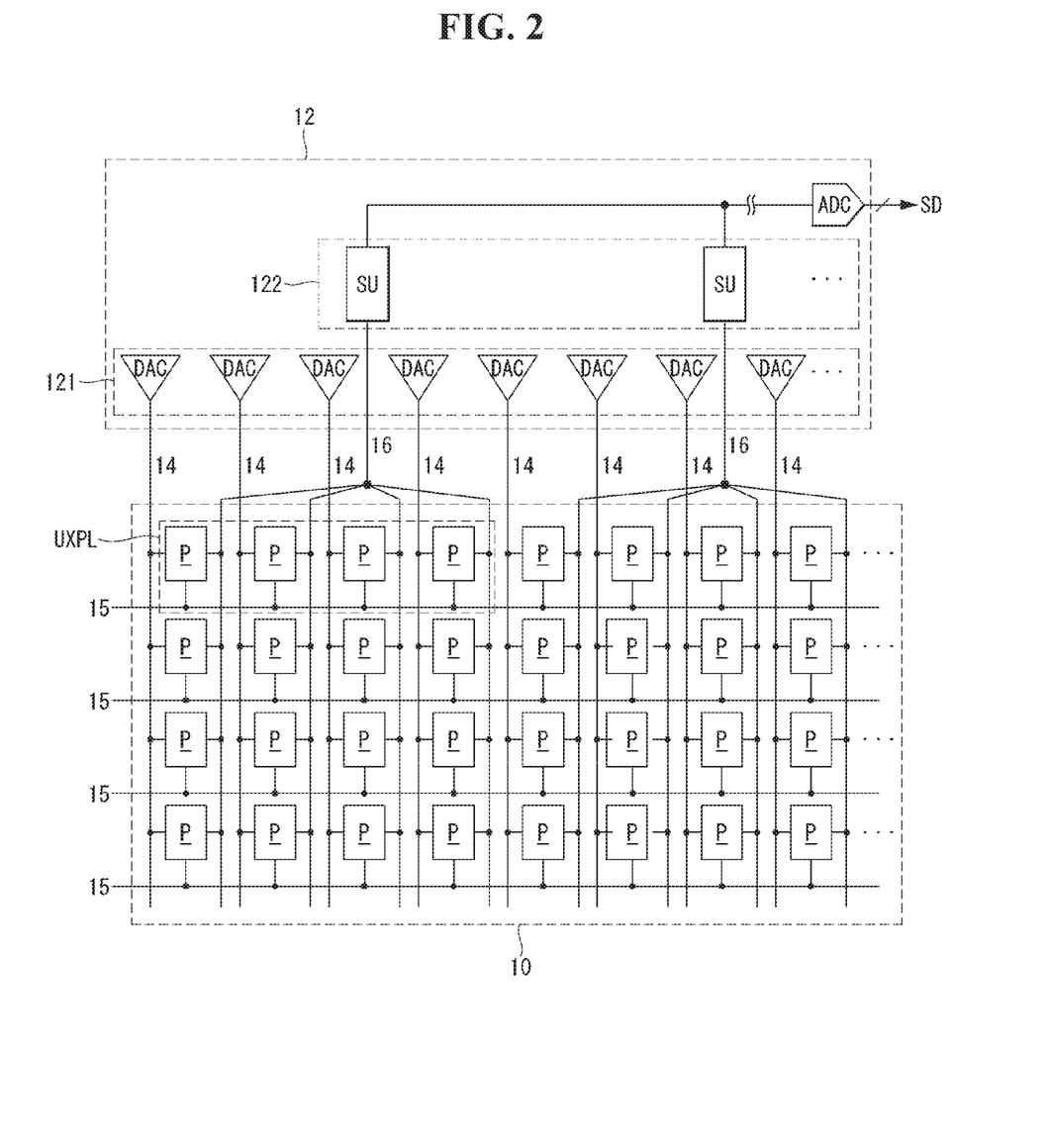
FIG. 2 shows the connecting configuration of the data driving circuit including the current sensing device of the present disclosure and a pixel array.
Figure 3:
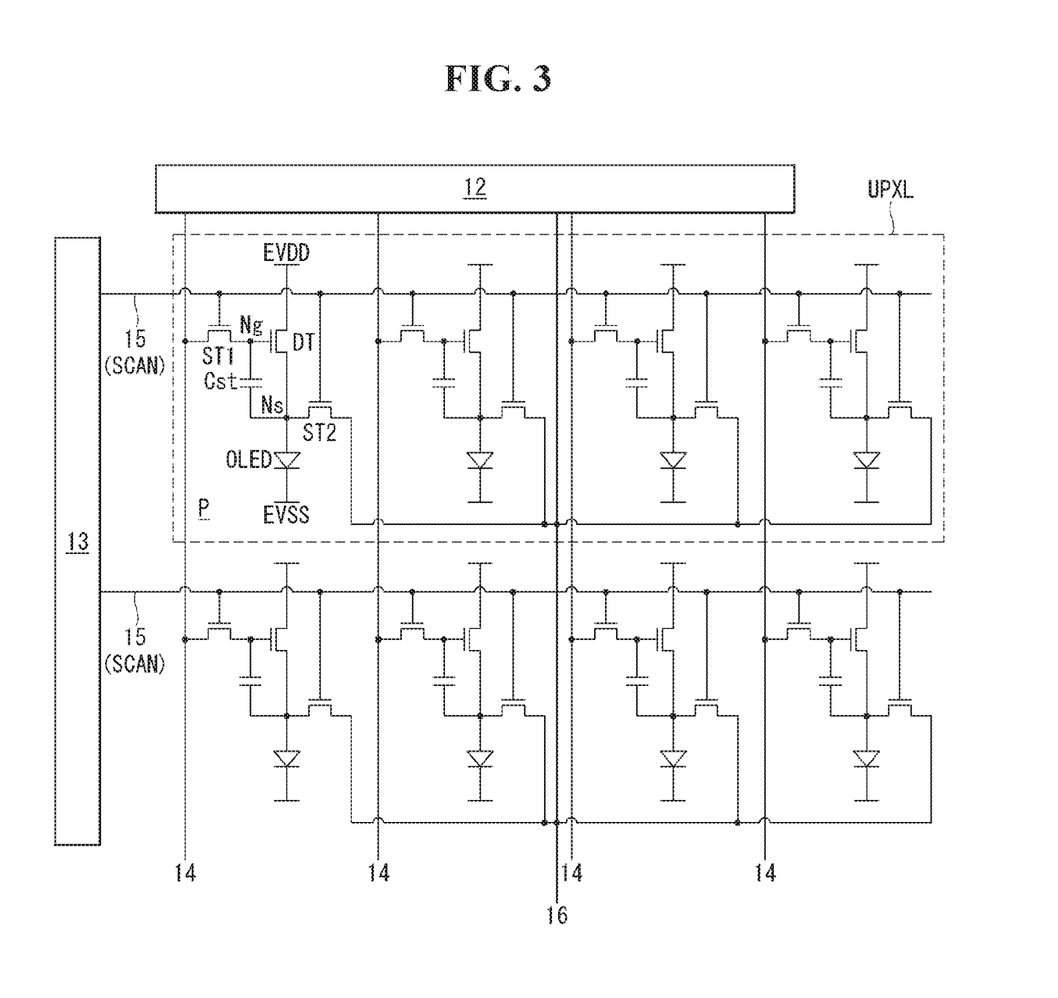
FIG. 3 shows the connecting configuration of the pixels constituting the pixel array according to one embodiment.
Figure 4:
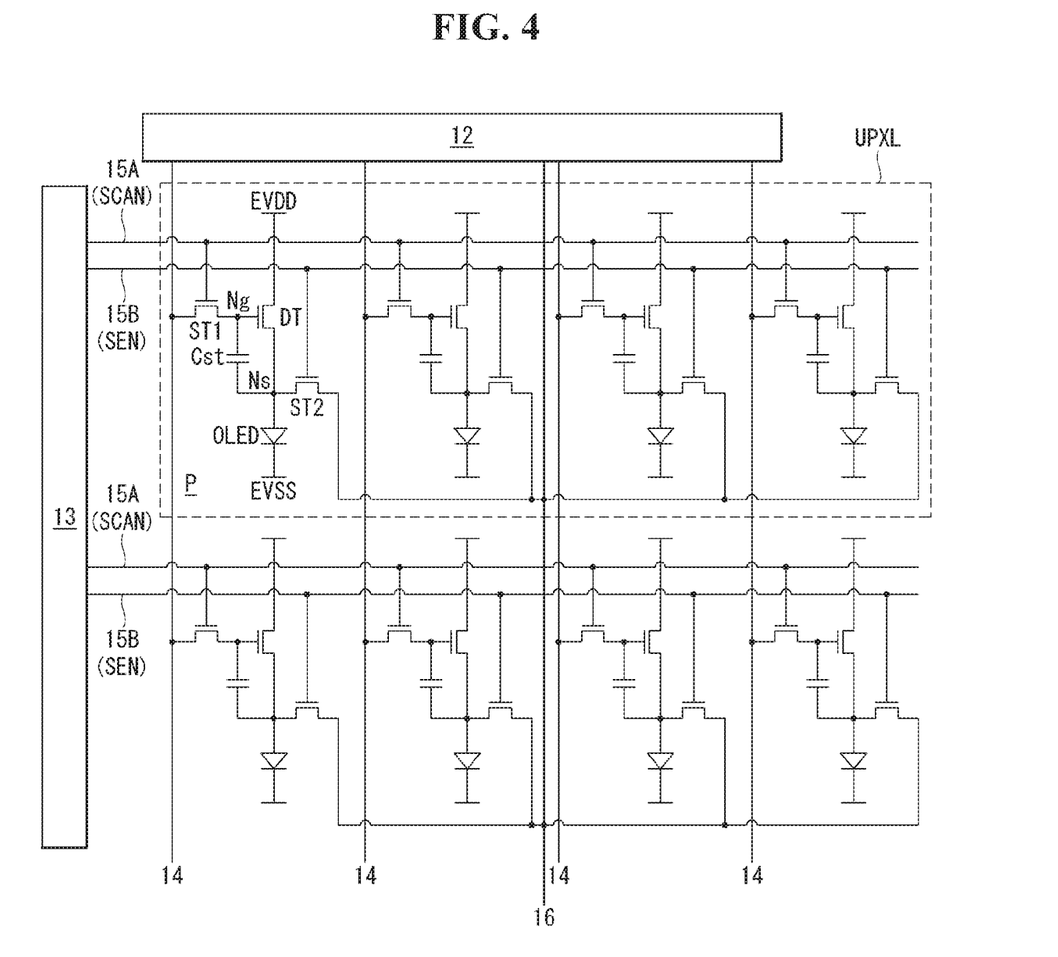
FIG. 4 shows another connecting configuration of the pixels constituting the pixel array according to another embodiment.

FIG. 1 shows a block diagram illustrating an organic light emitting display device according to an embodiment of the present disclosure, FIG. 2 shows the connecting configuration of the data driving circuit including the current sensing device of the present disclosure and a pixel array, and FIGS. 3 and 4 show various connecting configurations of the pixels constituting the pixel array.

Referring to FIGS. 1 to 4, the organic light emitting display device according to the embodiment of the present disclosure may comprise a display panel 10, a timing controller 11 and a data driving circuit 12 and a gate driving circuit 13. The data driving circuit 12 includes a current sensing circuit or current sensing device 122 according to an embodiment of the present disclosure.

A plurality of data lines 14 and sensing lines 16 and a plurality of gate lines 15 cross each other on the display panel 10, and the pixels for sensing P are arranged in a matrix form to form a pixel array. As shown in FIG. 4, the plurality of gate lines 15 may comprise a plurality of first gate lines 15A to which scan control signals SCAN are supplied and a plurality of second gate lines 15B to which sense control signals SEN are supplied. When the scan control signal SCAN and the sense control signals SEN are of a same phase to each other, the first and second gate lines 15A and 15B may be unified into one gate line 15 as shown in FIG. 3.

Each pixel P may be connected to one of the data lines 14, one of the sensing lines 16 and one of the gate lines 15. The pixels P constituting the pixel array may comprise the red pixels for displaying red color, the green pixels for displaying green color, the blue pixels for displaying blue color and the white pixels for displaying white color. Four pixels including the red pixel, the green pixel, the blue pixel and the white pixel may constitute one pixel unit UPXL. But, the configuration of the pixel unit UPXL is limited thereto. The plurality of pixels P constituting a same pixel unit UPXL may share one sensing line 16. Although not shown in the figure, a plurality of pixels P constituting the same pixel unit UPXL may be independently connected to different sensing lines. Each pixel P receives a high power voltage EVDD and a low power voltage EVSS from a power generator.

As shown in FIGS. 3 and 4, the pixel according to the present disclosure may comprise an OLED, a driving TFT DT, a storage capacitor Cst, a first switch TFT ST1 and a second switch TFT ST2, but is not limited thereto. The TFTs may be implemented of a p-type, an n-type or a hybrid-type in which the p-type and the n-type are mixed. The semiconductor layer of the TFT may include amorphous silicon, polysilicon, or an oxide. The OLED is a light-emitting element. The OLED may include an anode electrode connected to a source node Ns, a cathode electrode connected to an input terminal of a low power voltage EVSS, and an organic compound layer disposed between the anode electrode and the cathode electrode. The organic compound layer may include a hole injection layer (HIL), a hole transport layer (HTL), an emission layer (EML), an electron transport layer (ETL), and an electron injection layer (EIL).

The driving TFT DT controls the magnitude of the current flowing from a source electrode to a drain electrode to be input to the OLED according to the voltage difference Vgs between a gate electrode and the source electrode. The driving TFT DT comprises the gate electrode connected to a gate node Ng, the drain electrode connected to the input terminal of the high power voltage EVDD and the source electrode connected to a source node Ns. The storage capacitor Cst is connected between the gate node Ng and the source node Ns to hold the voltage Vgs between the gate and source electrodes of the driving TFT DT for a period of time. The first switch TFT ST1 switches the electric connection between the data line 14 and the gate node Ng according to the scan control signal SCAN. The first switch TFT ST1 comprises a gate electrode connected to the first gate line 15A, a first electrode connected to the data line 14 and a second electrode connected to the gate node Ng. The second switch TFT ST2 switches the electric connection between the sensing line 16 and the source node Ns according to the sense control signal SEN. The second switch TFT ST2 is equipped with a gate electrode connected to the second gate line 15B, a first electrode connected to the sensing line 16 and a second electrode connected to the source node Ns.

The first gate line 15A and the second gate line 15B may be unified into one gate line 15 (refer to FIG. 3). In this case, the scan control signal SCAN and the sense control signal SEN may have a same phase.

The organic light emitting display device having this pixel array adopts an external compensation method. The external compensation method senses the driving characteristics of the organic light emitting diode OLED and/or the driving TFT, and compensates for input image data according to sensed values. The driving characteristics of the OLED means the operating point voltage of the OLED. The driving characteristics of the driving TFT include a threshold voltage and electron mobility of the driving TFT.

The organic light emitting display device of the present disclosure performs an image displaying operation and an external compensating operation. The external compensating operation may be performed in a vertical blank interval during the image displaying operation, in a power on sequence before image display starts or in a power off sequence after the image display ends. The vertical blank interval is a period in which image data is not written, and disposed between vertical active intervals in which image data is written. The power on sequence means the period until image is displayed immediately after driving power is applied. The power off sequence means the period until the driving power is turned off immediately after the image display is terminated.

The timing controller 11 generates the data control signals DDC for controlling the operating timings of the data driving circuit 12 and the gate control signals GDC for controlling the operating timings of the gate driving circuit 13, based on the timing signals such as a vertical synchronization signal Vsync, a horizontal synchronization signal Hsync, a dot clock signal DCLK, a data enable signal DE and the like. The timing controller 11 may temporally separates a period during which the image displaying operation is performed and a period during which the external compensating operation is performed and generate the control signals DDC and GDC for the image displaying operation and the control signals DDC and GDC for the external compensating operation.

The gate control signals GDC may include a gate start pulse (GSP), a gate shift clock (GSC), and so on. The gate start pulse (GSP) is applied to the gate stage of generating a first scan signal to control the gate stage to generate the first scan signal. The gate shift clock (GSC) is commonly supplied to the gate stages to shift the gate start pulse (GSP).

The data control signals DDC includes a source start pulse (SSP), a source sampling clock (SSC), a source output enable signal (SOE), and so on. The source start pulse (SSP) controls a data sampling start timing of the data driving circuit 12. The source sampling clock (SSC) controls a sampling timing of data in respective source drive ICs, based on a rising or falling edge. The source output enable signal (SOE) controls an output timing of the data driving circuit 12. The data control signals DDC may further include various signals for controlling the operation of the current sensing device 122 included in the data driving circuit 12.

The timing controller 11 receives digital sensing values SD according to the external compensating operation from the data driving circuit 12. The timing controller 11 may correct input image data DATA based on the digital sensing values SD to compensate for the deteriorating deviation of the driving TFT or the OLED among pixels. The timing controller 11 transmits the corrected digital image data DATA to the data driving circuit 12 in the period for image display.

The data driving circuit 12 may comprise at least one source driver integrated circuit (IC). The source driver IC may comprise a latch array (not shown), a plurality of digital-analog converters (DAC) 121 connected to the data lines 14 and a current sensing device 122 connected to each sensing line 16 through a sensing channel. The current sensing device 122 includes a plurality of sensing units SU. The timing controller 11 is configured to compensate digital image data to be written to the display panel 10 based on the digital sensing value input from the sensing unit SU.

The latch array latches the digital image data DATA input from the timing controller 11 and supplies it to the DAC, based on the data control signals DDC. The DAC converts the digital image data DATA input from the timing controller 11 into the data voltage for displaying and supplies it to the data lines 14 when performing the image displaying operation. The DAC may generate the data voltage for sensing at a certain level and supply it to the data lines 14 when performing the external compensating operation.

Each sensing unit SU plays a role of converting the pixel current input through the sensing line into the digital sensing value SD. Each sensing unit SU may be implemented in a current sensing type including a current integrator. Each sensing unit SU includes a current transmitting unit to prevent noise amplification occurring in the current integrator. The current transmitting unit separates the electric connection between the sensing line 16 and the current integrator to prevent the amplification of the noise mixed to a first reference voltage of the current integrator. And, each sensing unit SU further includes a current buffer connected between the sensing line 16 and the current transmitting unit. The current buffer applies a second reference voltage to the source node Ns of a pixel P in order for a constant current input to a driving element included in a corresponding pixel P, when performing the external compensating operation. The sensing unit constituting the current sensing device will be described later in detail with reference to FIGS. 5 to 8.

The gate driving circuit 13 generates the scan control signal SCAN suitable for the image displaying operation and the external compensating operation based on the gate control signals GDC and supplies it to the first gate lines 15A. Also, the gate driving circuit 13 generates the sense control signal SEN suitable for the image displaying operation and the external compensating operation based on the gate control signals GDC and supplies it to the second gate lines 15B. Or, the gate driving circuit 13 may generate the scan control signal SCAN and the sense control signal SEN of a same phase suitable for the image displaying operation and the external compensating operation based on the gate control signals GDC and supplies it to the gate lines 15.

Figure 5:
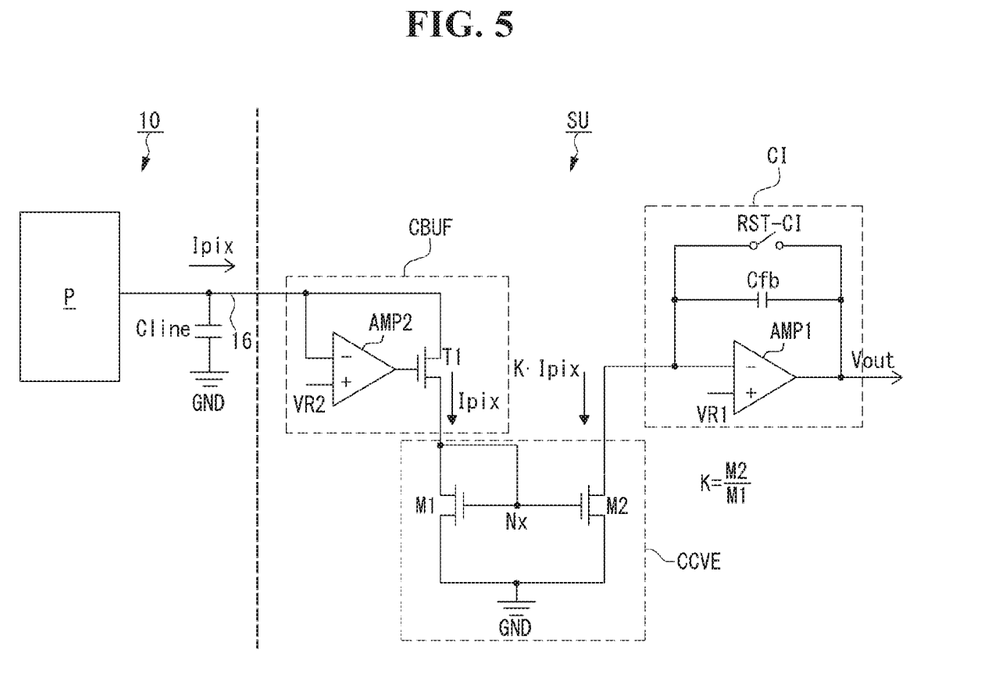
FIG. 5 shows the configuration of the sensing unit for implementing the current sensing device according to the present disclosure according to one embodiment.

FIG. 5 shows the configuration of the sensing unit for implementing the current sensing device according to the present disclosure.

Referring to FIG. 5, the sensing unit SU constituting the current sensing device according to the present disclosure comprises a current integrator CI and a current transmitting unit CCVE.

The current integrator CI is equipped with an integrating amplifier AMP1 comprising an inverting input terminal (−), a non-inverting input terminal (+), and an output terminal. A feedback capacitor Cfb is connected between the inverting input terminal (−) and the output terminal of the integrating amplifier AMP1, and a first reference voltage VR1 is input to the non-inverting input terminal (+) of the integrating amplifier AMP1. An integrating switch RST-CI is further connected between the inverting input terminal (−) and the output terminal of the integrating amplifier AMP1. The integrating switch RST-CI initializes the feedback capacitor Cfb by discharging the feedback capacitor Cfb. A sinking current K*Ipix flows out from the inverting input terminal (−) of the integrating amplifier AMP1 by the current transmitting unit CCVE. The output voltage Vout applied to the output terminal of the integrating amplifier AMP1 changes corresponding to the sinking current K*Ipix. That is, the output voltage Vout applied to the output terminal of the integrating amplifier AMP1 changes in a rising direction based on the first reference voltage VR1, by the sinking current K*Ipix flowing out from the inverting input terminal (−) of the integrating amplifier AMP1. If the output voltage Vout is designed to change in the rising direction based on the first reference voltage VR1, there are several advantages including securing a wide sensing range. This will be further described with reference to FIG. 8.

The current transmitting unit CCVE is connected between the sensing line 16 through which a pixel current Ipix flows and the current integrator CI. Without the current transmitting unit CCVE, the output voltage noise Vout_noise by the noise VR1 noise which is mixed to the first reference voltage VR1 is expressed by Equation 1.

$$V\text{out\_noise}=(1+\text{Cline}/\text{Cfb})*V R1\_\text{noise} \quad \text{[Equation 1]}$$

In Equation 1, 'Cline' is a parasitic capacitance existing in the sensing line and much greater than a capacitance Cfb of the feedback capacitor. Specifically, in the equation C*V=I*t, the multiplication of the capacitance C of the feedback capacitor and an output voltage V is equal to the multiplication of an input current I and a sensing time t. When the sensing time and the capacitance of the feedback capacitor are set, the pixel current may be measured by the change of the output voltage. Since the magnitude of the pixel current is very small in the display device with high resolution, the capacitance of the feedback capacitor should be reduced in order to establish the sensing time and the output voltage to be constant. So, without the current transmitting unit CCVE, the noise VR1_noise mixed to the first reference voltage VR1 cannot help being amplified according to a capacitance ratio Cline/Cfb. Owing to such amplified noise VR1_noise, the pixel current Ipix cannot be sensed accurately.

The current transmitting unit CCVE separates the electric connection of the sensing line 16 and the current integrator CI to prevent the amplification of the noise mixed to the first reference voltage VR1. In this case, the noise Vout_noise in the output voltage according to the noise VR1_noise mixed to the first reference voltage VR1 is same as Equation 2.

$$V\text{out\_noise}=(1+0/\text{Cfb})*V R1\_\text{noise}=V R1\_\text{noise} \quad \text{[Equation 2]}$$

As shown in Equation 2, the output voltage noise Vout_noise does not become greater than the noise VR1_noise mixed to the first reference voltage VR1.

And, the current transmitting unit CCVE plays a role in preventing the panel noise component input from the sensing line 16 being input to the current integrator CI.

The current transmitting unit CCVE causes the sinking current K*Ipix equal to or greater than the pixel current Ipix to be output from the inverting input terminal (−) of the integrating amplifier AMP1 by mirroring the pixel current Ipix. The current transmitting unit CCVE includes a first mirroring transistor M1 and a second mirroring transistor M2 for the current mirroring. A gate electrode and a first electrode of the first mirroring transistor M1 is connected to the shared node Nx to which the pixel current Ipix is applied, and a second electrode of the first mirroring transistor M1 is connected to a ground voltage source GND. A gate electrode of the second mirroring transistor M2 is connected to the shared node Nx, the first electrode of the second mirroring transistor M2 is connected to the inverting input terminal (−) of the integrating amplifier AMP1 and a second electrode of the second mirroring transistor M2 is connected to the ground voltage source GND. When the pixel current Ipix is applied to the shared node Nx, the pixel current sinks to the ground voltage source GND through the first mirroring transistor M1. At this time, by the current mirroring, a sinking current K*Ipix sinks to the ground voltage source GND through the second mirroring transistor M2. The sinking current K*Ipix may be equal to or different from the pixel current Ipix. The sinking current K*Ipix may be greater than or smaller than the pixel current Ipix. In case that the sinking current K*Ipix is greater than the pixel current Ipix, the channel capacitance (width of channel/length of channel) of the second mirroring transistor M2 may be designed greater than the channel capacitance of the first mirroring transistor M1. In case that the sinking current K*Ipix is equal to the pixel current Ipix, the channel capacitance of the second mirroring transistor M2 may be designed substantially same as the channel capacitance of the first mirroring transistor M1. In case that the sinking current K*Ipix is smaller than the pixel current Ipix, the channel capacitance (width of channel/length of channel) of the second mirroring transistor M2 may be designed smaller than the channel capacitance of the first mirroring transistor M1.

When the current transmitting unit CCVE causes the sinking current K*Ipix greater than the pixel current Ipix to be output from the inverting input terminal (−) of the integrating amplifier AMP1, there is no need of decreasing the capacitance of the feedback capacitor in the current integrator CI. That is, since the current integrator CI can have the feedback capacitor with great capacitance while having same sensing time and output voltage, it can solve the most problematic noise problem in sensing low current.

Referring to FIG. 5, the sensing unit SU constituting the current sensing device according to the present disclosure further includes a current buffer CBUF connected between the sensing line 16 and the current transmitting unit CCVE.

The current buffer CBUF applies a second reference voltage VR2 to the pixel P through which the pixel current Ipix flows to fix the voltage of the source node Ns of the pixel P to be constant, thereby allows a static current to flow through the driving element DT of the pixel P. The current buffer CBUF includes a buffer amplifier AMP2 and a buffer transistor T1.

An inverting input terminal (−) of the buffer amplifier AMP2 is connected to the sensing line 16, and the second reference voltage VR2 is input to a non-inverting input terminal (+) of the buffer amplifier AMP2. An output terminal of the buffer amplifier AMP2 is connected to the buffer transistor T1. A gate electrode of the buffer transistor T1 is connected to the output terminal of the buffer amplifier AMP2, a first electrode of the buffer transistor T1 is connected to the sensing line 16 and a second electrode of the buffer transistor T1 is connected to the shared node Nx of the current transmitting unit CCVE.

The current buffer CBUF transfers the pixel current Ipix input from the sensing line 16 to the current transmitting unit CCVE without signal attenuation. In order to accurately perform the current amplification at the current transmitting unit CCVE (in case that the sinking current K*Ipix is greater than the pixel current Ipix), the second reference voltage VR2 of the buffer amplifier AMP2 may be set substantially equal to the first reference voltage VR1 of the current integrator CI, including design error. But, in case that the current transmitting unit CCVE performs a simple mirroring (in case that the sinking current K*Ipix is equal to the pixel current Ipix), the first and second reference voltages VR1 and VR2 may be set to be same.

Figure 6:
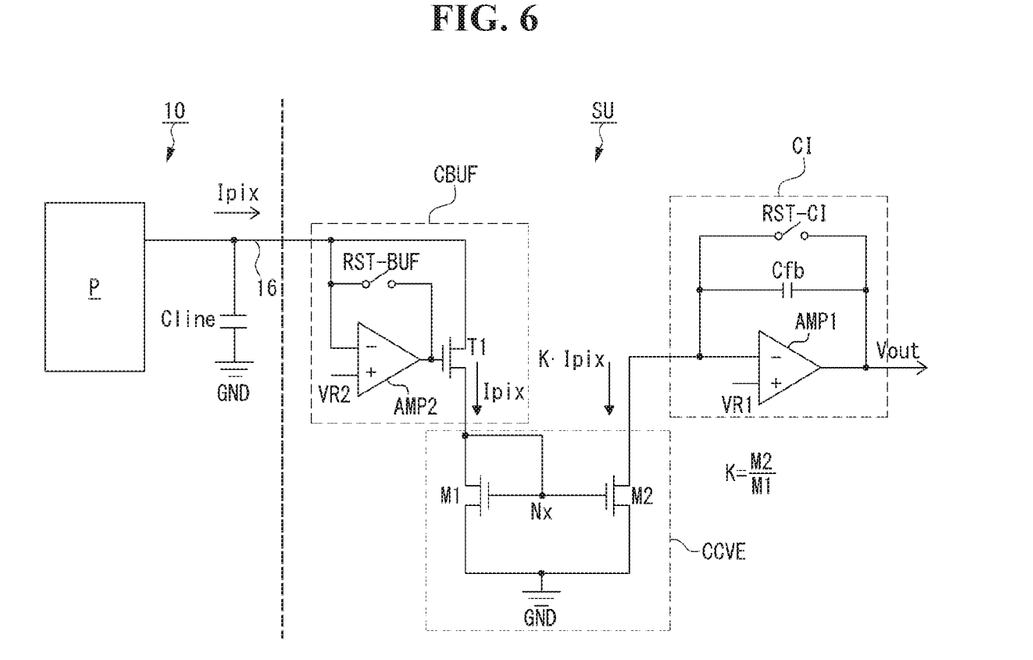
FIG. 6 shows the configuration of sensing unit for implementing the current sensing device according to the present disclosure according to another embodiment.

FIG. 6 shows the configuration of another sensing unit for implementing the current sensing device according to the present disclosure.

Referring to FIG. 6, another sensing unit SU constituting the current sensing device according to the present disclosure includes a current integrator CI and a current transmitting unit CCVE, and may further includes a current buffer CBUF.

The current integrator CI and the current transmitting unit CCVE of FIG. 6 is substantially same as those in FIG. 5.

And, the current buffer CBUF in FIG. 6 is also same as that of FIG. 5, except for a buffer switch RST-BUF.

The buffer switch RST-BUF is connected between the sensing line 16 and the output terminal of the buffer amplifier AMP2, and turned on in synchronization with the timing for resetting the source node Ns of the pixel P to the second reference voltage VR2.

The buffer amplifier AMP2 applies the second reference voltage VR2 to the source node Ns of the pixel P according to a virtual ground principle. In this case, since the parasitic capacitance Cline of the sensing line is large, it takes long time for the source node Ns of the pixel P to be reset to the second reference voltage VR2. The buffer switch RST-BUF plays a role in reducing the time required for resetting the source node Ns of the pixel P to the second reference voltage VR2

Figure 7:
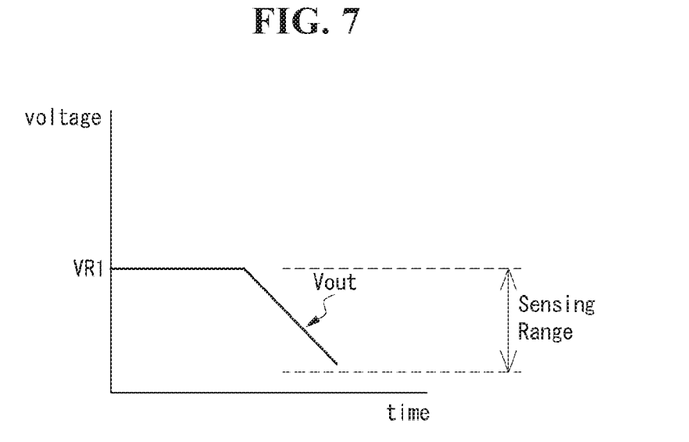
FIG. 7 shows the output waveform of the current integrator when sourcing charges with the current integrator according to one embodiment.
Figure 8:
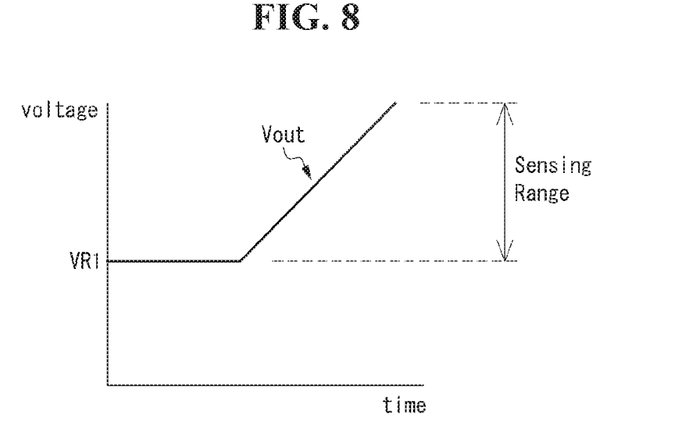
FIG. 8 shows the output waveform of the current integrator when sinking charges from the current integrator according to another embodiment.

FIG. 7 shows the output waveform of the current integrator when sourcing charges with the current integrator, and FIG. 8 shows the output waveform of the current integrator when sinking charges from the current integrator.

In order to reduce a power consumption and improve efficiency, the light emitting element OLED having a low operating point voltage (threshold voltage) is used in the organic light emitting display device. In the conventional sensing unit in which the current integrator CI is directly connected to the sensing line 16, the pixel current flowing through the driving element DT of the pixel P is sensed after the source node Ns of the pixel P is reset to the first reference voltage VR1 of the current integrator CI. Here, if the voltage of the source node Ns is higher than the operating point voltage of the light emitting element OLED, the pixel current which is to be sensed mostly flows into the light emitting element OLED, making it impossible to sense the pixel current. In order to avoid this, the first reference voltage VR1 of the current integrator CI must be set lower than the operating point voltage of the light emitting element OLED. At this time, since the conventional sensing unit adopts a charge sourcing method, that is the method of sensing the pixel current input to the inverting input terminal of the current integrator, the output voltage Vout changes in the direction in which the output voltage is lowered with respect to the first reference voltage VR1, so a sensing range becomes narrow, as shown in FIG. 7. If a sensing range is narrow, accurate sensing is difficult.

To the contrary, since the sensing unit according to the present disclosure adopts a charge sinking method, that is the method of sensing the sinking current flowing out from the inverting input terminal (−) of the current integrator CI, the output voltage Vout changes in the direction in which the output voltage rises with respect to the first reference voltage VR1, and a sensing range becomes wide as a result, as shown in FIG. 8. That is, even though the first reference voltage VR1 is set low considering the operating point voltage of the light emitting element OLED, the present disclosure may secure a wide sensing range. If the sensing range is wide, it is possible to prevent the sensing value from being saturated near the boundary of the sensing range, and it is easy to increase the sensing accuracy.

A current sensing device and organic light emitting display device according to various embodiments of the disclosure may be described as follows.

A current sensing device includes a plurality of sensing units, each sensing unit playing a role of converting a pixel current input through a sensing line into a digital sensing value. Each sensing unit comprises a current integrator including an integrating amplifier and a feedback capacitor, the integrating amplifier comprising an inverting input terminal, a non-inverting input terminal and an output terminal, wherein the feedback capacitor is connected between the inverting input terminal and the output terminal, and a first reference voltage is input to the non-inverting input terminal; and a current transmitting unit connected between the sensing line and the current integrator to separate the electric connection of the sensing line and the current integrator, wherein the current transmitting unit mirrors the pixel current and causes the mirrored current to be output from the inverting input terminal of the integrating amplifier.

The current transmitting unit comprises a first mirroring transistor, wherein a gate electrode and a first electrode of the first mirroring transistor is connected to a shared node to which the pixel current is applied, and a second electrode of the first mirroring transistor is connected to a ground voltage source; and a second mirroring transistor, wherein a gate electrode of the second mirroring transistor is connected to the shared node, the first electrode of the second mirroring transistor is connected to the inverting input terminal of the integrating amplifier, and a second electrode of the second mirroring transistor is connected to the ground voltage source.

The mirrored current is greater than the pixel current, and a channel capacitance of the second mirroring transistor is greater than a channel capacitance of the first mirroring transistor.

The current sensing device further comprises a current buffer connected between the sensing line and the current transmitting unit, wherein the current buffer applies a second reference voltage to the pixel through which the pixel current flows to fix a voltage of a source node of the pixel to be constant.

The current buffer comprises a buffer amplifier, wherein an inverting input terminal of the buffer amplifier is connected to the sensing line, the second reference voltage is input to a non-inverting input terminal of the buffer amplifier, and an output terminal of the buffer amplifier is connected to a buffer transistor; and the buffer transistor, wherein a gate electrode of the buffer transistor is connected to the output terminal of the buffer amplifier, a first electrode of the buffer transistor is connected to the sensing line, and a second electrode of the buffer transistor is connected to the current transmitting unit.

The current buffer further comprises a buffer switch connected between the sensing line and the output terminal of the buffer amplifier, and turned on in synchronization with a timing for resetting the source node of the pixel to the second reference voltage.

The second reference voltage is set substantially equal to the first reference voltage.

An output voltage applied to the output terminal of the integrating amplifier changes in a rising direction based on the first reference voltage.

An organic light emitting display device comprises a display panel equipped with a plurality of pixels and a plurality of sensing lines connected to the pixels; a data driving circuit which includes the current sensing device according to one of the appended claims and connected to each sensing line through a sensing channel; and a timing controller configured to compensate digital image data to be written to the display panel based on the digital sensing value input from the sensing unit.

A plurality of data lines and sensing lines and a plurality of gate lines cross each other on the display panel, wherein the pixels for sensing are arranged in a matrix form to form a pixel array, wherein each pixel is connected to one of the data lines, one of the sensing lines and one of the gate lines.

The organic light emitting display device further comprises a gate driving circuit which generates a scan control signal and a sense control signal suitable for an image displaying operation and an external compensating operation based on gate control signals and supplies the scan control signal and the sense control signal to same or different gate line.

The timing controller generates data control signals for controlling operating timings of the data driving circuit and the gate control signals for controlling operating timings of the gate driving circuit, wherein the timing controller temporally separates a period during which the image displaying operation is performed and a period during which the external compensating operation is performed and generates the control signals for the image displaying operation and the control signals for the external compensating operation.

Each pixel includes an OLED and a driving TFT, wherein the timing controller receives the digital sensing value from the data driving circuit, corrects input image data based on the digital sensing values to compensate for a deteriorating deviation of the driving TFT or the OLED among the pixels, and transmits the corrected digital image data to the data driving circuit in the period during which the image displaying operation is performed.

As described above, by connecting the current transmitting unit between the sensing line and the current integrator, the present disclosure may reduce the parasitic capacitance component acting as an amplifying ratio of the current integrator. In spite of sensing a low current, the present disclosure can cause an amplified sinking current to be output from the current integrator by mirroring in the current transmitting unit, so can design a feedback capacitor with large capacitance in the current integrator and solve the most problematic noise problem in sensing a low current.

Furthermore, the present disclosure further comprises the current buffer connected between the sensing line and the current transmitting unit to constantly fix the voltage of the source node of the pixel to the reference voltage of the current buffer, thereby allowing a static current to flow through the driving element of the pixel and improving the sensing accuracy.

And, by adding the buffer switch which directly connects the output terminal of the buffer amplifier to the sensing line to the current buffer, the present disclosure can reduce the time required for resetting the source node of the pixel to the reference voltage of the current buffer.

Throughout the description, it should be understood by those skilled in the art that various changes and modifications are possible without departing from the technical principles of the present disclosure. Therefore, the technical scope of the present disclosure is not limited to the detailed descriptions in this specification but should be defined by the scope of the appended claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A current sensing device including a plurality of sensing units, each sensing unit comprising:
    a sensing line directly, electrically connected to a pixel having a source node, the sensing line configured to carry a pixel current;
    a current buffer including:
        (i) a buffer amplifier having an inverting input terminal, a non-inverting input terminal, and an output terminal;
        (ii) a buffer transistor having a gate electrode, a first electrode being a source, or a drain, electrode, and a second electrode being a drain, or a source electrode, respectively; and
        (iii) a buffer switch having a first end and a second end,
        wherein the inverting input terminal of the buffer amplifier is directly, electrically connected (a) to the sensing line, (b) to the first end of the buffer switch, and (c) to the first electrode of the buffer transistor, wherein the output terminal of the buffer amplifier is directly, electrically connected to the gate electrode of the buffer transistor, wherein the non-inverting input terminal of the buffer amplifier is at a second reference voltage, and wherein the buffer switch is operatively configured to turn on in synchronization with a timing for resetting the source node of the pixel to the second reference voltage;
    a current transmitting unit including:
        (i) a first mirroring transistor having a gate electrode, a first electrode being a source, or a drain, electrode, and a second electrode being a drain, or a source electrode, respectively;
        (ii) a shared node; and
        (iii) a second mirroring transistor having a gate electrode, a first electrode being a source, or a drain, electrode, and a second electrode being a drain, or a source electrode, respectively,
        wherein the first electrode of the first mirroring transistor is directly, electrically connected: (a) to the second electrode of the buffer transistor, (b) to the shared node, (c) to the gate electrode of the first mirroring transistor, and (d) to the gate electrode of the second mirroring transistor, and wherein the second electrodes of the first and second mirroring transistors are directly, electrically connected to a ground voltage source; and
    a current integrator including:
        (i) an integrating amplifier having an inverting input terminal, a non-inverting input terminal, and an output terminal;
        (ii) a feedback capacitor having a first end and a second end; and
        (iii) an integrating switch having a first end and a second end,
        wherein the inverting input terminal of the integrating amplifier is directly, electrically connected (a) to the first electrode of the second mirroring transistor, (b) to the first end of the feedback capacitor, and (c) to the first end of the integrating switch, wherein the output terminal of the integrating amplifier is directly, electrically connected (a) to the second end of the integrating switch, and (b) to the second end of the feedback capacitor, and wherein the non-inverting input terminal of the integrating amplifier is at a first reference voltage, wherein the current transmitting unit, in operation, mirrors the pixel current and causes a mirroring current to be output from the inverting input terminal of the integrating amplifier, and wherein the current buffer, in operation, applies the second reference voltage to the pixel through the sensing line that carries the pixel current.

2. The current sensing device according to claim 1, wherein a mirroring current is greater than the pixel current, and a channel capacitance of the second mirroring transistor is greater than a channel capacitance of the first mirroring transistor.

3. The current sensing device according to claim 1, wherein the second reference voltage is set substantially equal to the first reference voltage.

4. The current sensing device according to claim 1, wherein an output voltage at the output terminal of the integrating amplifier changes in a rising direction based on the first reference voltage.

\* \* \* \* \*